United States Patent [19]

Yamazaki et al.

[11] Patent Number: 5,408,224
[45] Date of Patent: Apr. 18, 1995

[54] MAINTENANCE SCHEDULE MONITORING DEVICE FOR A LASER BEAM MACHINE SYSTEM

[75] Inventors: Etsuo Yamazaki, Hachioji; Kazuhiro Suzuki, Minamitsuru, both of Japan

[73] Assignee: Fanuc Limited, Yamanashi, Japan

[21] Appl. No.: 142,111

[22] PCT Filed: Apr. 4, 1991

[86] PCT No.: PCT/JP91/00450

§ 371 Date: Nov. 26, 1991

§ 102(e) Date: Nov. 26, 1991

[87] PCT Pub. No.: WO91/15329

PCT Pub. Date: Oct. 17, 1991

Related U.S. Application Data

[63] Continuation of Ser. No. 776,362, Nov. 26, 1991, abandoned.

[30] Foreign Application Priority Data

Apr. 5, 1990 [JP] Japan .................................. 2-91312

[51] Int. Cl.⁶ .............................................. G08B 21/00
[52] U.S. Cl. ................................. 340/679; 340/309.15
[58] Field of Search .............. 340/679, 309.15, 691, 340/457.4; 364/474.16–474.2, 474.22; 368/10

[56] References Cited

U.S. PATENT DOCUMENTS

| | | | |
|---|---|---|---|
| 4,151,725 | 5/1979 | Kountz et al. | 62/182 |
| 4,387,368 | 6/1983 | Day, III et al. | 340/539 |
| 4,539,632 | 9/1985 | Hansen et al. | 340/309.15 X |
| 4,596,203 | 6/1986 | Lorek | 340/542 X |
| 4,864,283 | 9/1989 | Seto | 340/584 |

FOREIGN PATENT DOCUMENTS

| | | | |
|---|---|---|---|
| 2823558 | 12/1979 | Germany . | |
| 2142172 | 1/1985 | United Kingdom . | |
| 8601322 | 2/1986 | WIPO | 340/457.4 |

*Primary Examiner*—John K. Peng
*Assistant Examiner*—Thomas J. Mullen, Jr.
*Attorney, Agent, or Firm*—Staas & Halsey

[57] ABSTRACT

A maintenance schedule monitoring device is provided for a laser beam machine system, which is designed to monitor the maintenance schedule of the laser beam machine system. A time measuring unit (A) measures the time for which an object requiring maintenance is operating, according to information on the operation of the object requiring maintenance in the laser beam machine system. A time alarm unit (B) detects that the measured time has reached a preset time, and causes a maintenance schedule display control unit (C) to display an instruction that it is time to carry out a maintenance of the object, on a display unit (D). Thus, the maintenance and inspection schedule of the object requiring maintenance is automatically managed by automatic chronological time measurement, and when it is time to carry out the maintenance and inspection, an indication that it is time to carry out the maintenance of the object requiring maintenance is automatically shown on the display unit (D).

5 Claims, 5 Drawing Sheets

```
NO.     MAINTENANCE ITEM              PRESET TIME (H)
 1  REPLACEMENT OF VANE PUMP OIL           500
 2  REPLACEMENT OF ROOTS BLOWER OIL       2000
 3  BENT MIRROR                            200
 4  CHILLER AUTOMATIC DRAIN                100
 5  REPLACEMENT OF CHILLER WATER           200
 6
 7
 8
 9
10
INPUT COLUMN:
```

MAINTENANCE SCHEDULE MONITORING DEVICE FOR A LASER BEAM MACHINE SYSTEM

This application is a continuation of application Ser. No. 07/776,362, filed Nov. 26, 1991, now abandoned.

BACKGROUND OF THE INVENTION

1. Field of the Invention

The present invention relates to a maintenance schedule monitoring device for a laser beam machine system, and more particularly, to a maintenance time monitoring device for informing the user that it is time to carry out a maintenance and inspection of all laser beam machine component elements requiring maintenance.

2. Background Art of the Related

A laser beam machine incorporates a relatively large number of component elements in the structure of the laser oscillator and the like thereof, which require a periodic maintenance and inspection.

In the laser beam machine, examples of the maintenance items and the component elements that require a periodic maintenance and inspection include a replacement of the lubricating oil of the vane pump of the cooling water supply system, a replacement of the lubricating oil of the Roots blower of the laser gas supply system, a replacement of the filter and the cooling water of the cooling water supply system, and an alignment of the bent mirror of the laser optical system, and the like.

Conventionally, the schedules for the above-mentioned periodic maintenance and inspection of the many component elements requiring maintenance are generally managed by entering the maintenance and inspection intervals and the dates of implementing the maintenance and inspection and the like in a maintenance data sheet or the like for each maintenance item of each object requiring maintenance, in accordance with the instructions given in a service manual or the like, or by pasting a label or the like, showing a maintenance and inspection schedule, on a machine.

The management of maintenance and inspection schedules described above depends entirely on the user, and as it is cumbersome, it often is not carried out properly. For example, merely pasting a label showing the maintenance and inspection interval onto a machine has little effect for reminding the user that it is time to carry out the maintenance and inspection, and as a result, the user often does not remember to implement the maintenance and inspection at the proper time.

SUMMARY OF THE INVENTION

The present invention is intended to solve the problems posed by the conventional management method for the maintenance and inspection schedules of a laser beam machine, and the object of the present invention is to provide a maintenance schedule monitoring device which is able to automatically and accurately notify the user that it is time to carry out the maintenance and inspection of an object requiring maintenance.

To fulfill the aforementioned object, a maintenance schedule monitoring device for a laser beam machine system is provided, which comprises a time measuring means (A) designed to measure the working time of an object requiring maintenance in response to information received on whether or not said object in the laser beam machine system is working, a time alarm means (B) designed to detect that said time measured by said time measuring means (A) has reached a preset time, and a maintenance schedule display control means (C) designed to issue an instruction for indicating that it is time to carry out a maintenance of said object requiring maintenance on a display means (D) when said time alarm means (B) detects that said maintenance time has reached said preset time.

In the maintenance schedule monitoring device for a laser beam machine system according to the present invention, said time measuring means (A) may be designed to measure the working time of said object to requiring maintenance, depending on the working condition of said object requiring maintenance.

Also, the maintenance schedule monitoring device for a laser beam machine system according to the present invention may be provided with an input means (E) whereby data and parameters related to the maintenance items and maintenance times of said object requiring maintenance are updated and entered as required.

Further, the maintenance schedule monitoring device for a laser beam machine system according to the present invention may be provided with a maintenance and inspection implementation detecting means (F) designed to detect that a maintenance operation and inspection of said object requiring maintenance have been carried out, a resetting means (G) designed to reset the time measurement by said time measuring means (A) when said maintenance and inspection implementation detecting means (F) detects that the maintenance and inspection of said object requiring maintenance has been carried out, and to cancel the display instruction issued by said maintenance schedule display control means (C), and a resetting means (H) designed to reset the time measurement made by said time measuring means (A) in response to a specific signal given by an input through a specific key, and to cancel the display instruction issued by said maintenance schedule display control means (C).

According to the configuration described above, the maintenance and inspection schedule of an object requiring maintenance is automatically managed by an automatic chronological time measurement, and when it is time for the maintenance and inspection to be carried out, an indication showing that it is time to carry out the maintenance on an object requiring maintenance is automatically shown on a display means such as a CRT.

If the time measuring means is designed to measure the working time of an object requiring maintenance according to the working condition of said object requiring maintenance, a more accurate management of the maintenance schedule can be achieved where the maintenance schedule of an object requiring maintenance varies in accordance with a work load and the like, as well as the working time of the object requiring maintenance.

A device provided with the input means enables not only a manufacturer but also a user to register new maintenance items and/or maintenance times of an object requiring maintenance, or to change such items as necessary.

Also, in a device provided with the aforementioned resetting means, the display control means does not cancel a display instruction unless the maintenance and inspection has been carried out, or a specific key or keys are operated. This feature minimizes the chance of failing to observe that it is time to carry out the maintenance, due to an accidental resetting. Further, the display control means continues to issue the display instruction until properly reset, and thus the user is always made aware that it is time to carry out the maintenance.

DESCRIPTION OF THE PREFERRED EMBODIMENT

An embodiment of the present invention is described in detail hereinafter with reference to the accompanying drawings.

Figure 2:
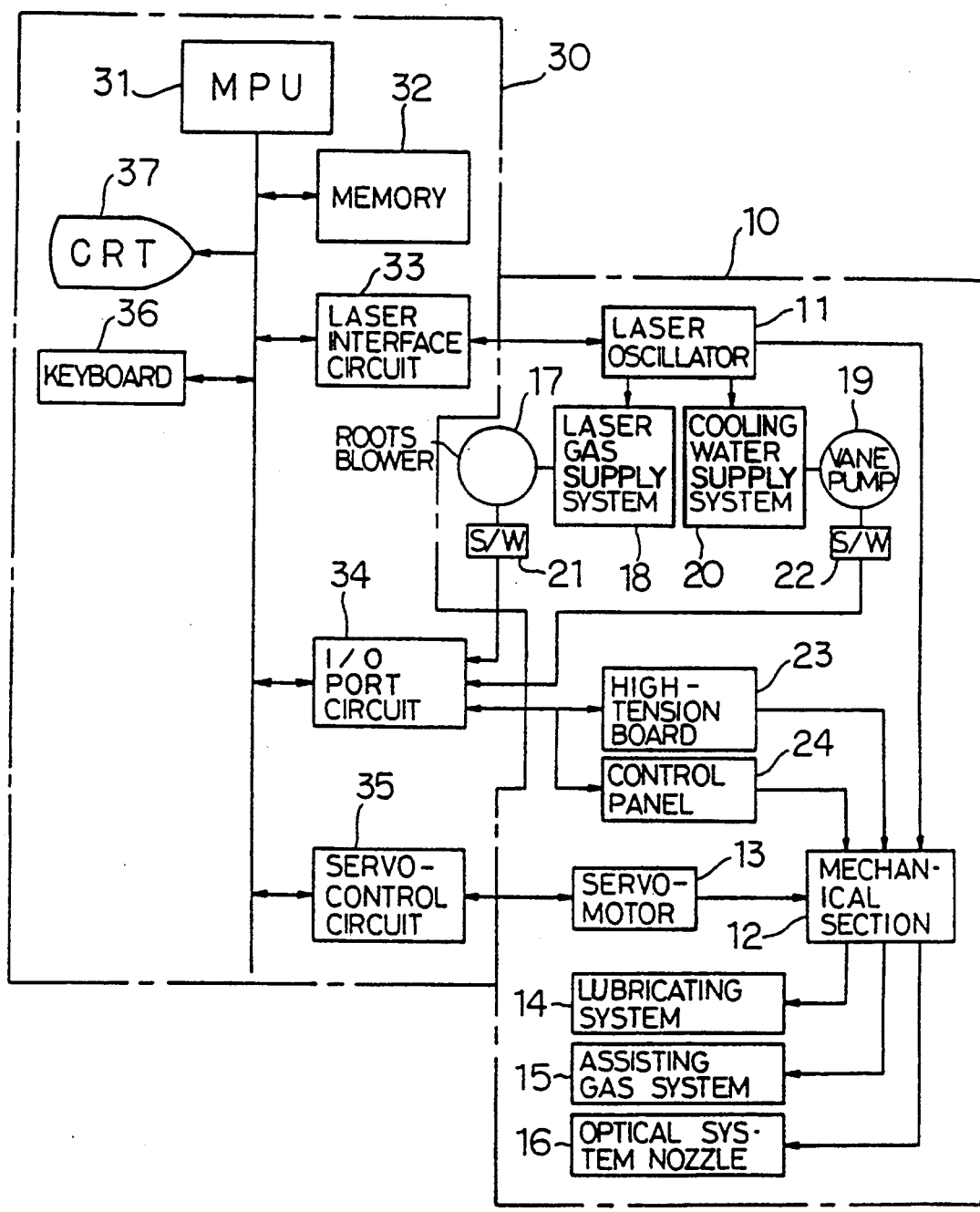
FIG. 2 is a block diagram showing an embodiment of a laser beam machine system incorporating the maintenance schedule monitoring device according to the present invention.

FIG. 2 shows an embodiment of the laser beam machine system incorporating the maintenance schedule monitoring device according to the present invention. The laser beam machine system comprises a laser beam machine 10 and controller 30.

The laser beam machine 10 consists of or includes a laser oscillator 11 for generating a laser beam, a mechanical section 12 comprising a worktable and nozzle head, etc., a servomotor 13 for driving the mechanical section 12, a lubricating system 14 provided for the mechanical section 12, an assisting gas system 15, an optical system nozzle 16 for radiating the laser beam, a high-tension board 23 for a power supply control and the like, and a control panel 24.

The laser oscillator 11 is a gas laser type and is provided with a laser gas supply system 18 having a Roots blower 17, and a cooling water supply system 20 having a vane pump 19.

A controller 30 is designed to perform a numerical control and the maintenance schedule monitoring according to the present invention, and comprises a microprocessor unit (MPU) 31, a memory 32 consisting of a ROM and RAM and the like, a laser interface circuit 33 for an input and output of control signals for the laser oscillator 11, an I/O port circuit 34 for an input and output of control signals for the high-tension board 23 and the control panel 24, a servo control circuit 35 for an input and output of control signals for the servomotor 13, a keyboard 36 manually operated by a user to generate instructions, and a CRT 37 serving as a display means.

Figure 1:
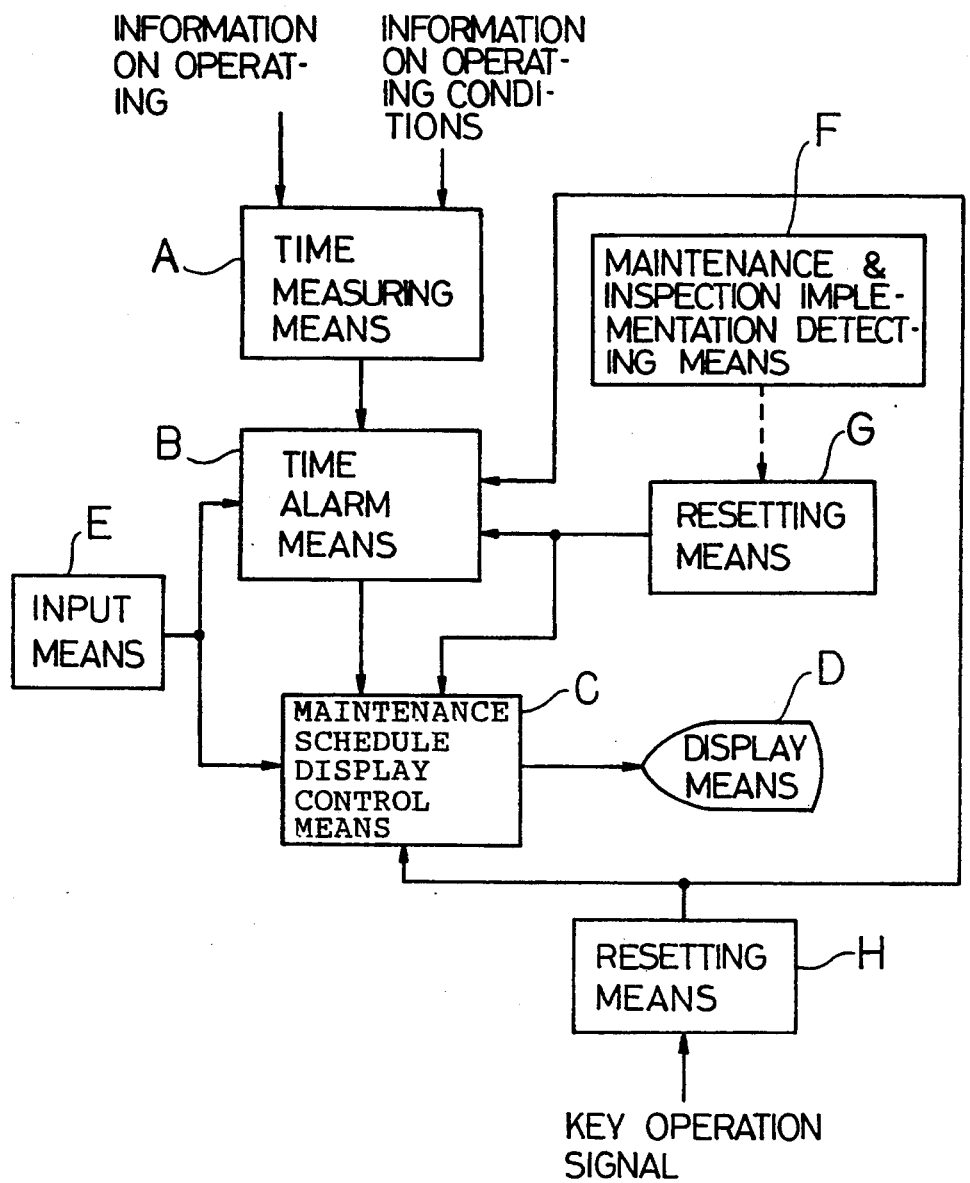
FIG. 1 is a conceptual drawing of a maintenance schedule monitoring device for a laser beam machine system according to the present invention.

The memory 32 stores a system program which includes a maintenance and inspection schedule monitoring program, and in accordance with the maintenance and inspection monitoring program, the time measuring means A, the time alarm means B, and the maintenance schedule display control means C are called up by software, as shown in FIG. 1.

More specifically, the microprocessor unit 31 is given information on whether or not an object requiring maintenance, a Roots blower 17, for example, in the laser beam machine 10 is working, and measures the time for which the Roots blower 17 is working by the time measuring means A. The microprocessor unit 31 constantly monitors, by the time alarm means B, the time measured by the time measuring means A, and detects whether or not the preset time according to the maintenance schedule for each object requiring maintenance has been reached. When it is detected that said time measured by the time measuring means A has reached said preset time, the microprocessor unit stores the data showing this, in the memory 32, and further, sends the data to the maintenance schedule display control means C. The maintenance schedule display control means C is designed to generate and send a display instruction showing that it is time to carry out the maintenance of said object requiring maintenance, to the CRT 37, in response to a signal indicating that the time alarm means B has detected that the maintenance time has reached said preset time. When the display instruction is issued, the CRT 37 displays on a screen that it is time to carry out the maintenance of the object requiring maintenance.

The time measuring means A may be designed so that the working time of the object requiring maintenance such as the Roots blower 17, is measured according to the operating conditions, including the rotational speed, of the object requiring maintenance. Such a flexible measurement may be decided by the microprocessor unit 31 from the control signals supplied to the Roots blower 17 or from the control signals fed back and received from the Roots blower 17.

The resetting means G is designed to be called up when a specific signal is given by depressing a specific key, for example, a password key, on the keyboard 36 or by depressing a predetermined set of keys at the same time. When this procedure is carried out, the resetting means G resets the time measurement performed by the time measuring means A and cancels the display instruction issued by the maintenance schedule display control means C.

For maintenance and inspection items such as the replacing of the oil of the Roots blower 17 and of the vane pump 19, the maintenance and inspection implementation detecting means F detects, by limit switches 21 and 22 incorporated in the caps of the oil supply ports, that the oil caps have been removed for replacing the oil, and thus decides that a maintenance operation and inspection have been implemented. Namely, the resetting means G can be called up by a signal received from the limit switch 21 or 22.

Figures 3, 4:
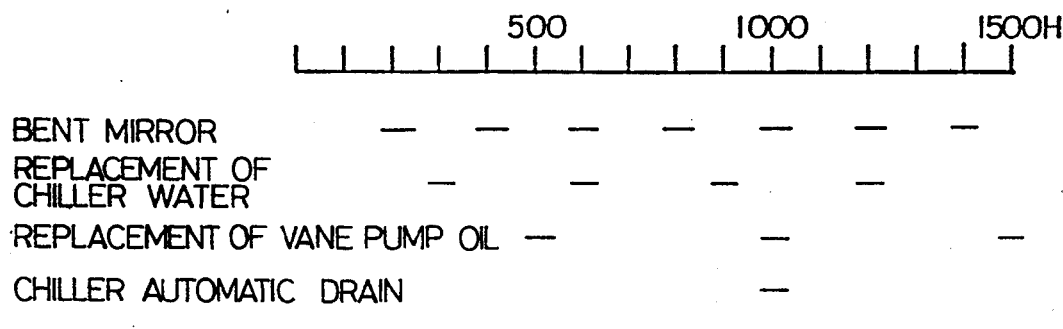
FIG. 3 is an explanatory drawing showing an example of a display screen of a display means used when entering data in a maintenance schedule monitoring device for a laser beam machine system according to the present invention.
FIG. 4 is a time chart showing an example of a schedule indicating that it is time to carry out the maintenance, in the maintenance schedule monitoring device for the laser beam machine system according to the present invention.

The maintenance items and maintenance intervals, i.e., the preset times, of an object requiring maintenance, which is monitored by the maintenance schedule monitoring device according to the present invention are preset for five items common to all systems, from maintenance items No. 1 through No. 5 as shown in FIG. 3. Also, for maintenance items No. 6 through No. 10, the maintenance items and maintenance intervals (preset times) of the object requiring maintenance are defined by the machine manufacturer or user, as required, through the keyboard 36. Therefore, the keyboard 36 functions as an entering means for registering new maintenance items or intervals, or updating same as necessary. Maintenance items and maintenance intervals are entered interactively through the keyboard 36, and messages pertaining thereto are displayed at the bottom of a data input screen as shown in FIG. 3.

FIG. 4 shows a schedule indicating that it is time to carry out the maintenance for the maintenance items Nos. 1 through 5 shown in FIG. 3.

Figure 5:
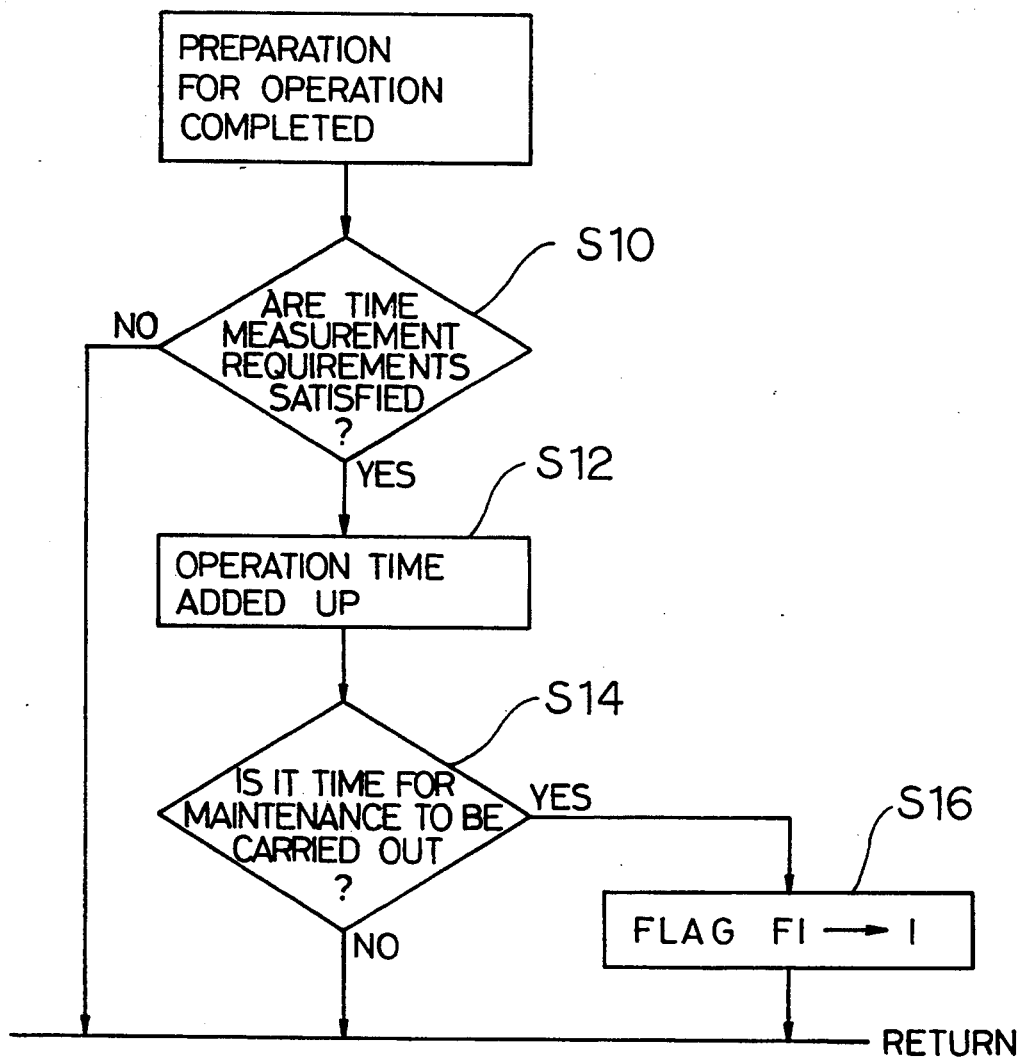
FIG. 5 is a flowchart showing a maintenance schedule detecting routine in the maintenance schedule monitoring device for the laser beam machine system according to the present invention.

FIG. 5 shows the routine for detecting the arrival of a maintenance and inspection time. The numbers following "S" in FIG. 5 denote step numbers. The processing routine shown in FIG. 5 is repeatedly implemented at specified intervals. After the preparation for operation is completed, it is determined in step 10 whether or not the time measurement requirements are satisfied. The time measurement requirements mean whether or not the object requiring maintenance is working, or whether or not the object requiring maintenance is working under a certain operating condition in addition to whether or not it is working. If the time measurement requirements are met, then the program proceeds to step 12, and if not, the program returns to the previous step.

In step 12, the working time is added up, and thus the time for which an object requiring maintenance has worked is measured by the counting method. The program then proceeds from step 12 to step 14.

In step 14, it is determined whether or not the time measured in step 12 has reached the preset maintenance time, and this step is repeated until the maintenance time is reached. When the maintenance time is reached, the program goes to step 16.

In step 16, a flag F1=1 indicating that it is time to carry out the maintenance of an object requiring maintenance is stored in the memory 32.

Figure 6:
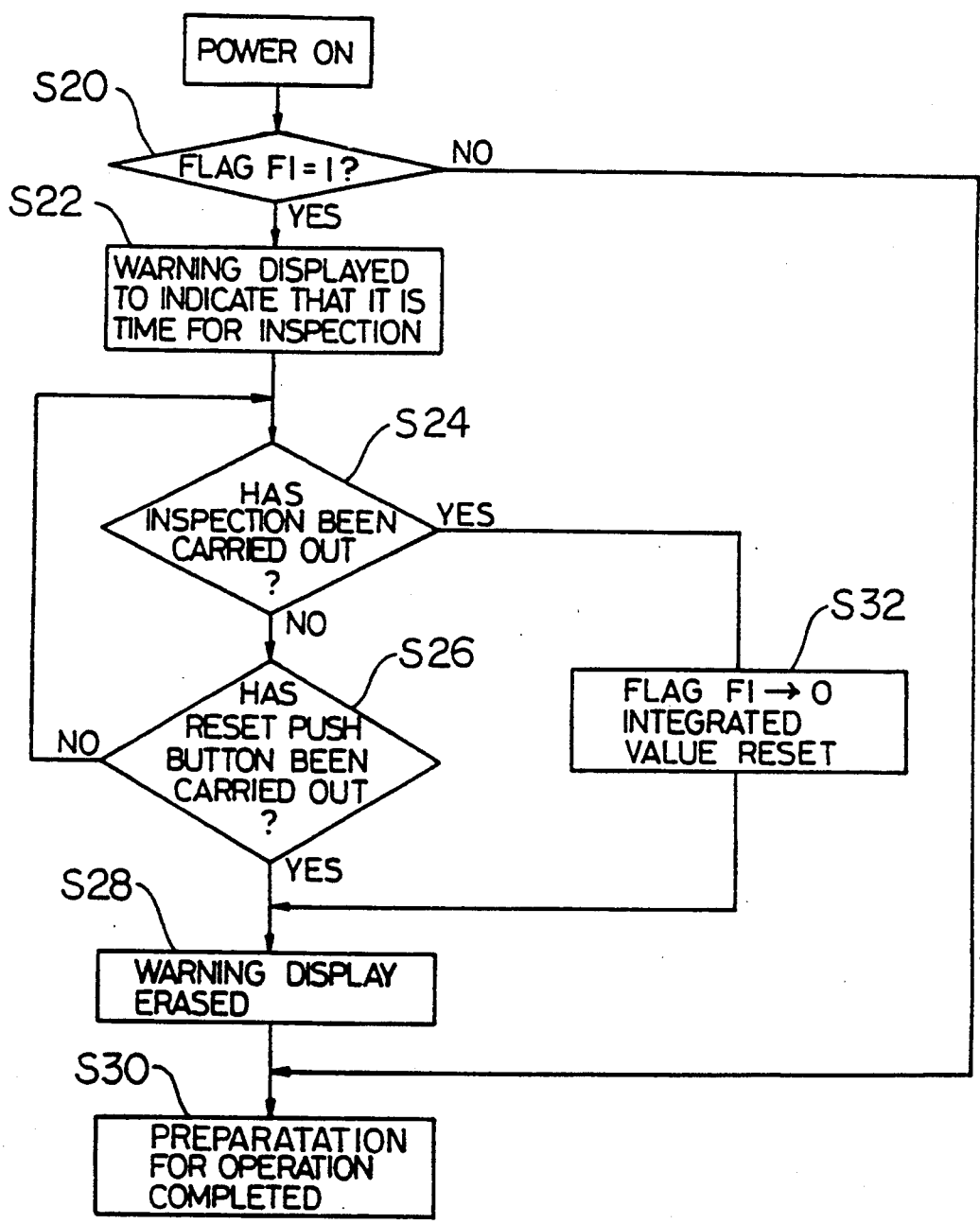
FIG. 6 is a flowchart showing an example of a display & resetting routine in the maintenance schedule monitoring device for the laser beam machine system according to the present invention.

FIG. 6 indicates the inspection schedule display and resetting routine, and the numbers following "S" are step numbers. In the routine, it is first determined in step 20 whether or not the flag F1 is 1. If the flag F1 is 1, which means that it is time for the maintenance to be carried out, then the program advances to step 22; if the flag F1 is not 1, then the program proceeds to step 30 and the preparation for operation is completed.

In step 22, a warning indicating that it is time for the inspection to be carried out is displayed on the screen of the CRT 37.

After step 22, the program goes to step 24 and it is determined, by a signal received from the limit switch 21 or 22, whether or not inspection has been carried out. If it is detected that the inspection has been carried out, then the program proceeds to step 32, while it proceeds to step 26 if it is detected that the inspection has not been implemented.

In step 26, it is determined whether or not the resetting pushbutton provided on the keyboard 36 or the control panel 24 has been depressed. If it is determined that the resetting pushbutton has not been depressed, then the program goes back to step 24, and if it is determined that the pushbutton has been depressed, then step 28 is implemented.

In step 28, the warning displayed on the screen of the CRT 37 is erased, and the program advances to step 30.

Step 32 is implemented when it is confirmed that the inspection has been carried out. In this step, the flag F1 is reset to 0, and an integrated value of the working time is also reset.

When the inspection schedule display and resetting routine is carried out as described above, even if the resetting pushbutton is depressed the flag F1 maintains the condition 1 unless it is confirmed that the inspection has been carried out. Accordingly, the display of a warning that it is time for the inspection to be carried out is repeatedly made at the CRT 37 whenever the laser beam machine system is restarted. The flag F1 is reset only when it is confirmed that the inspection has been carried out, and the integrated value of the working time is also reset so that the time measurement for the next inspection time may be started.

If the preset inspection schedule differs from one inspection item to another, then the maintenance and inspection time detecting routine and the inspection schedule display and resetting routine as discussed above are carried out independently for each inspection item.

As explained above, in the maintenance schedule monitoring device for a laser beam machine system according to the present invention, the maintenance and inspection schedule of an object requiring maintenance is automatically managed by automatic chronological time measurement, and when the maintenance and inspection time is reached, an indication that it is time to carry out the maintenance of the object requiring maintenance is automatically given on a display means such as a CRT, and therefore, the management of the maintenance and inspection schedules can be automatically performed without fail, eliminating the need for depending on the care of the user.

If the time measuring means is designed so that the measurement of the working time of an object requiring maintenance is performed according to the working condition of the object requiring maintenance, then a more accurate management of maintenance schedules can be achieved where the maintenance interval of an object requiring maintenance varies in accordance with the work load and the like in addition to the working time of the object requiring maintenance.

If the system is provided with an input means, then not only the manufacturer but also the user is able to register new maintenance items and/or maintenance intervals of an object requiring maintenance, or to update same as necessary, and this makes it possible for individual users to perform an accurate management of maintenance schedules.

If the system is provided with a resetting means, then the display control means does not cancel the display instruction until the maintenance and inspection have been carried out or a specific key or keys are depressed. This minimizes the chance of failing to observe that it is time to carry out the maintenance due to an accidental resetting. The display control means continues to issue the display instruction until a specific person responsible for maintenance management properly performs the resetting operation, and thus the user is always made aware that it is time to carry out the maintenance.

We claim:

1. A maintenance schedule monitoring device for a laser beam machine system designed to monitor a maintenance schedule for the laser beam machine system, comprising:

time measuring means for receiving information on whether an object requiring maintenance in the laser beam machine system is working, and for measuring a time during which said object requiring maintenance is working;

time alarm means for detecting that the time measured by said time measuring means has reached a preset time; and maintenance schedule display control means for generating and displaying an instruction indicating that maintenance is required of said object requiring maintenance on display means, when said time alarm means detects that the time during which said object requiring maintenance is working has reached the preset time, said time measuring means measuring the time during which said object requiring maintenance is working in accordance with a working condition experienced by said object requiring maintenance and comprising an operating condition including a rotational speed of the object requiring maintenance.

2. The maintenance schedule monitoring device for a laser beam machine system according to claim 1, further comprising input means for updating data for maintenance tasks and maintenance intervals required by said object requiring maintenance.

3. The maintenance schedule monitoring device for a laser beam machine system according to claim 1, further comprising:

maintenance and inspection implementation detecting means for detecting that an operation occurring during maintenance and inspection of said object requiring maintenance has been performed, and resetting means for resetting the time measured by said time measuring means and for cancelling the instruction indicating that the maintenance is required of said object requiring maintenance displayed by said maintenance schedule display control means when said maintenance and inspection implementation detecting means detects that the maintenance operation of said object requiring maintenance has been performed.

4. The maintenance schedule monitoring device for a laser beam machine system according to claim 1, further comprising resetting means for resetting the time measured by said time measuring means and for cancelling the instruction indicating that the maintenance is required of said object requiring maintenance displayed by the said maintenance schedule display control means, upon receiving a reset signal generated by depressing at least one reset key.

5. The maintenance schedule monitoring device for a laser beam machine system according to claim 1, wherein a maintenance interval for said object requiring maintenance is adjusted in accordance with machine work load and working time, wherein said working time is measured responsive to operating conditions including rotational speed of said object requiring maintenance.

* * * * *